United States Patent [19]
Lehmann et al.

[11] 3,853,627
[45] Dec. 10, 1974

[54] LITHIUM ELECTRIC CELLS WITH NOVEL POSITIVE ACTIVE MATERIALS AND NON-AQUEOUS ELECTROLYTE

[75] Inventors: Gerard Lehmann; Jean-Paul Gabano, both of Poitiers, France

[73] Assignee: Societe des Accumulateurs Fixes et de Traction (Societe Anonyme), Romainville, France

[22] Filed: Apr. 27, 1971

[21] Appl. No.: 137,845

[30] Foreign Application Priority Data
Jan. 14, 1971  France .............................. 71.01175

[52] U.S. Cl. ................ 136/83, 136/100 R, 136/137, 136/154
[51] Int. Cl. ........................................ H01m 17/02
[58] Field of Search .......... 136/83, 6, 100, 20, 137, 136/107, 111, 120, 96, 154

[56] References Cited
UNITED STATES PATENTS

| | | | |
|---|---|---|---|
| 2,571,616 | 10/1951 | Ruben | 136/7 |
| 2,778,754 | 1/1957 | Shorr | 136/137 |
| 2,967,898 | 1/1961 | Ruben | 136/119 |
| 3,189,485 | 6/1965 | Panzer | 136/93 |
| 3,310,436 | 3/1967 | Ralston et al. | 136/137 X |
| 3,468,708 | 9/1969 | Davis et al. | 136/137 X |
| 3,511,716 | 5/1970 | Gabano et al. | 136/100 R |
| 3,658,592 | 4/1972 | Dey | 136/6 |
| 3,681,143 | 8/1972 | Dey | 136/83 R |

*Primary Examiner*—Anthony Skapars
*Attorney, Agent, or Firm*—Kenyon & Kenyon Reilly Carr & Chapin

[57] ABSTRACT

Electric cells of high energy density with lithium negative electrodes, substantially insoluble positive active materials selected from the group of argentous chromate and lead chromate and a non-aqueous electrolyte which is a molar or 1.5 molar solution of lithium perchlorate in a solvent selected from the group consisting of tetrahydrofuran-propylene carbonate, methylformatepropylene carbonate, tetrahydrofuran-dimethyl carbonate, tetrahydrofuran-dimethoxyethane-propylene carbonate, tetrahydrofurandimethoxyethane, and tetrahydrofuran-dimethoxyethane-propylene carbonate.

11 Claims, 5 Drawing Figures

LITHIUM ELECTRIC CELLS WITH NOVEL POSITIVE ACTIVE MATERIALS AND NON-AQUEOUS ELECTROLYTE

BACKGROUND OF INVENTION

This invention relates to electric cells with non-aqueous electrolytes, of the type comprising a lithium negative electrode.

In the presently known cells of this type the positive active material is generally constituted by copper sulfide, silver chloride, copper chloride, silver oxide and less advantageously mercuric chloride.

The electrolyte may be preferably a molar solution of lithium perchlorate in a mixture of tetrahydrofuran and 1-2 dimethoxyethane.

In such a cell the positive active material must be as insoluble as possible so that its transport towards the negative electrode in the dissolved state is prevented.

Researches have been carried out with the object of finding new positive active materials which can be used in such a cell, are insoluble in the electrolyte and provide suitable energy.

Principal objects and features of the present invention are an electric cell with a non-aqueous electrolyte, of the type comprising a lithium negative electrode, wherein the positive active material is substantially insoluble in the electrolyte while providing suitable energy. It mainly comprises a chromate selected from the group consisting of argentous chromate and lead chromate which have been found to meet these requirements.

Argentous chromate, $Ag_2CrO_4$ and lead chromate $PbCrO_4$ are more especially advantageous in that they are particularly insoluble in the above-mentioned electrolyte, which is a molar of 1.5 molar solution of lithium perchlorate in a mixture of tetrahydrofuran and dimethoxyethane. The solubility has been found in practice to be 260 mg/l for argentous chromate and even less for lead chromate whereas for example, silver chloride and argentic oxide are found to have respective solubilities of 439 and 535 mg/l. The capacity per unit of volume of the argentous chromate-lithium system is about 627 ampere-hours per $dm^3$ and its energy per unit of volume is about 2,000 watts-hours per $dm^3$. The capacity per unit volume of lead chromate is 695 $Ah/dm^3$ and its energy is about 2,160 Wh per $dm^3$. It may be seen that such systems are very interesting particularly for producing miniature cells of high voltage and low discharge rate.

They are all the more interesting as either argentous chromate or lead chromate are discharged at only one voltage level whereas, for example, the basic chromate $Ag_2CrO_5$ is discharged at two voltage levels. As already mentioned, argentous chromate and lead chromate are very insoluble compounds by themselves. Moreover, they do not form any soluble complex during discharge. Lastly, it is to be noted that the oxidizing properties of $CrO_3$ are not used in the electrochemical reaction.

Good results have also been obtained with electrolytes comprising other solvents than the hereabove mentioned one.

Another object and feature of this invention is an electric cell of the type comprising a lithium negative electrode, the positive active material being mainly comprised of a chromate selected from the group consisting of argentous chromate and lead chromate, wherein the electrolyte solvent is selected from the group consisting of propylene carbonate, tetrahydrofuran, dimethyl carbonate, and mixtures of tetrahydrofuranpropylene carbonate, methylformate - propylene carbonate, tetra-hydrofuran - dimethyl carbonate, tetrahydrofuran - dimethoxyethane propylene carbonate and tetrahydrofuran-dimethoxyethane.

Advantageously, the electrolyte is either a molar or 1.5 molar solution of lithium perchlorate, more especially if the electrolyte solvent is a mixture tetrahydrofuran-dimethyl carbonate.

In the case of the above-mentioned mixtures, the following proportions (by volume) may be used

| | |
|---|---|
| tetrahydrofuran (THF) 70 | propylene carbonate (PC) 30 |
| tetrahydrofuran (THF) 20 | dimethyl carbonate (DMC) 80 |
| propylene carbonate (PC) 50 | methylformate (MF) 50 |
| propylene carbonate (PC) 20 | tetrahydrofuran (THF) 56 - dimethoxyethane (DME) 24 |
| tetrahydrofuran (THF) 70 | dimethoxyethane (DME) 30 |

Results relating to the conductivity of the electrolytes according to the invention and the solubility of argentous chromate in such electrolytes have been gathered in Table 1.

TABLE 1

| No. | Electrolyte | Conductivity $(ohm^{-1}) \cdot 10^{-3}$ | Solubility $Ag_2CrO_4$ (Mg/l in Ag) |
|---|---|---|---|
| 1 | PC, LiClO$_4$ IM | 4.85 | 15 |
| 2 | THF, LiClO$_4$ IM | 3 | 0 |
| 3 | DMC, LiClO$_4$ IM | 5 | 106 |
| 4 | PC-MF (50/50 in vol.), LiClO$_4$ IM | 15 | 36 |
| 5 | THF-PC (70/30), LiClO$_4$ IM | 9.5 | 35 |
| 6 | THF-DME-PC (56/24/20), LiClO$_4$ IM | 8.9 | 100 |
| 7 | THF-DMC (80/20) LiClO$_4$ 1.5 M | 4.90 | 100 |
| 8 | THF-DMC (26/80) LiClO$_4$ 1.5 M | 3.85 | 100 |

Tests have been made at the boiling temperature of the said solvents. The results obtained for the PC-MF (No. 4 above) and PC-THF (No. 3 above) mixtures are as follows:

TABLE 2

| % Vol. PC | % Vol. MF | Boiling Temp. °C |
|---|---|---|
| 100 | 0 | 241 |
| 75 | 25 | 79 |
| 50 | 50 | 54 |
| 25 | 75 | 47 |
| 0 | 100 | 42 |

TABLE 2-Continued

| % Vol. PC | % Vol. MF | Boiling Temp. °C |
| --- | --- | --- |
| 100 | 0 | 241 |
| 75 | 25 | 108 |
| 50 | 50 | 86 |
| 25 | 75 | 83 |
| 0 | 100 | 65 |

DRAWINGS

The invention will now be described in detail in the following examples in relation to the annexed drawings forming part hereof and in which.

DETAILED DESCRIPTION

Miniature sealed cells of very small size have been made according to the invention and may, for instance, be used in watches.

Figure 1:
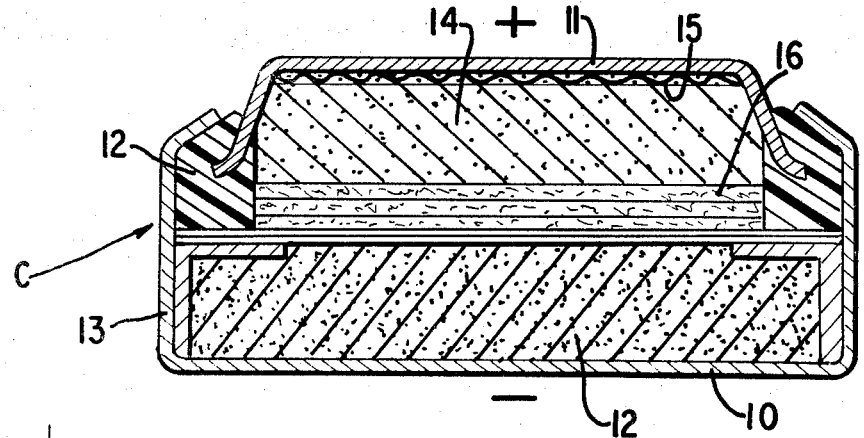
FIG. 1 shows in section the structure of a button type cell made according to the invention.

The structure of such cells is shown in FIG. 1 of the annexed drawings.

As may be seen in FIG. 1, the cell C is of the button type comprising a metallic bottom cup 10 and a metallic cover 11, both, for example, of stamped nickel plated steel. The cathode 12 is mainly made of argentous chromate according to the invention. It is a mixture of 99 percent argentous chromate and 1 percent carbon black (or any other material ensuring a good electrical conductivity of the electrode). This mixture is directly pressed into cup 10 and is held in place as by ring 13, made, e.g., of stamped steel.

The anode 14 is a lithium disk. A grid 15 made of nickel plated steel, or stainless steel, is welded to cover 11 of the cell and is embedded in this disk 14. This ensures both good cohesion and good electrical contact.

The separator bears reference 16. It may be constituted by one or several layers of felted fibers unaltered by the electrolyte and the active materials. Polypropylene can be advantageously used in contact with the positive electrode or cathode 12 and cellulosic materials in contact with the negative electrode or anode 14.

Example 1

The non-aqueous electrolyte of cell C is constituted by a lithium perchlorate solution in a solution in a solvent mixture of tetrahydrofuran and 1-2 dimethoxyethane. This solution may comprise 62 percent by weight of tetrahydrofuran, 27 percent by weight of dimethoxyethane and 11 percent of lithium perchlorate.

An electrically insulating gasket 17 ensures the sealing between the joined bottom cup 10 and the cover 11 of the casing and also the electrical insulation of those two parts which respectively constitute the electric terminals of the cell.

Cells have been made with the following characteristics:

cathode 12: $Ag_2CrO_4$ (99 percent) by weight plus carbon black (1 percent by weight): 750 mg, theoretical capacity 120 mAh. anode 14: lithium disk 1.2 mm thick 8.4 mm diameter with an embedded stainless steel grid 15 welded to the negative cover 11. electrolyte with the above-mentioned composition:
100 microliters in the cathode and
80 microliters in the anode compartments. Total weight of the cell 1.7 g
Outer diameter 11.2 mm
Total height 5.8 mm
Total volume of the cell 0.58 cm$^3$ After a 24 hours rest, the cell C discharging across a 9,100 ohm resistor has given the following results:

| | |
| --- | --- |
| average discharge voltage | 2.95 volts |
| discharge time | 380 hrs (end voltage 1.7v) |
| discharged capacity | 120 mAh |
| cathode efficiency | 100% |
| output energy | 355 mwh |
| energy per unit of volume | 615 wh/dm$^3$ |
| internal resistance | about 100 ohms at half discharge |

Other tests have been made by discharging the cell across a 62,000 ohm resistor (discharge time: about 3 months). It has been found that after operating for about 1,200 hours, the cell voltage was quite steady and equal to 3.15 volts These tests are illustrated by the curves of FIGS. 2 and 3 which represent the discharge voltage plotted against the discharge time, voltage V in volts being plotted as ordinates and time T as abscissae.

Figure 2:
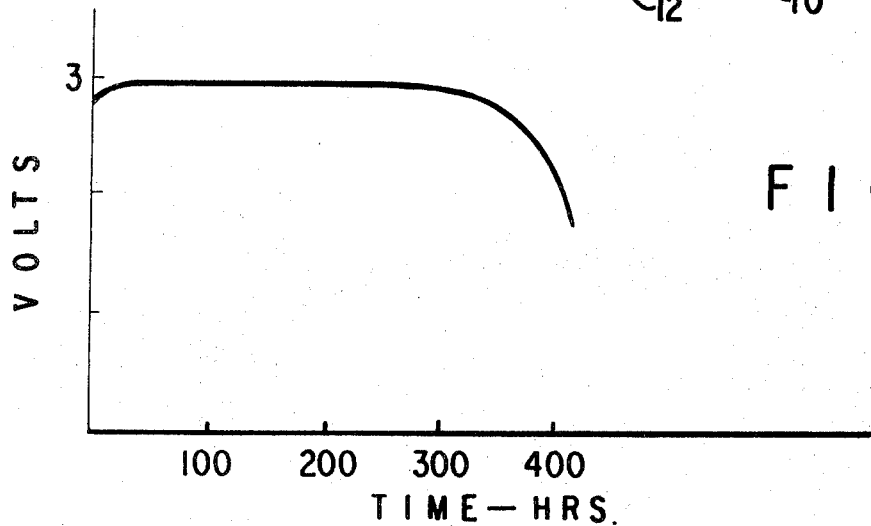
FIG. 2 is a graph which shows the discharge of a cell such as is shown in FIG. 1 with a positive active material of argentous chromate across a 9,100 ohm resistor.
Figure 3:
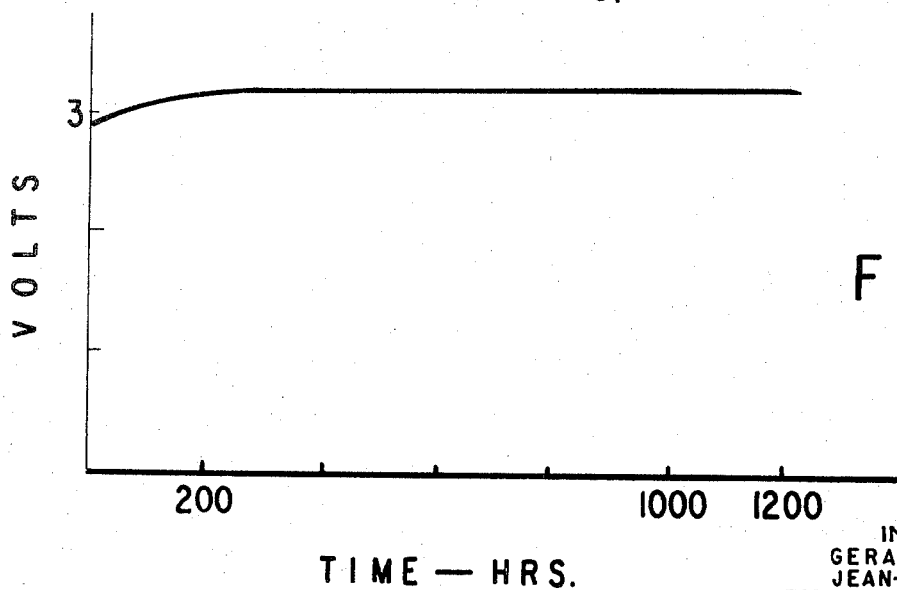
FIG. 3 shows a graph which shows the discharge of a similar cell across a 62,000 ohm resistor.

The curve of FIG. 2 illustrates the discharge across the 9,100 ohm resistor and that of FIG. 3 the discharge across the 62,000 ohm resistor.

Other cells have been made by substituting lead chromate for argentous chromate, and either propylene carbonate or a mixture of (PC) propylene carbonate 20 percent by volume - tetrahydrofuran (THF) 70 percent by volume for the mixture of tetrahydrofurandimethoxyethane.

In such cells, the composition of the cathode material was as follows: lead chromate 99 percent and carbon black 1% both by weight. The open circuit voltage was about 3.10 V. The average voltage of such a cell discharged through a 62,000 ohm resistor was 2.56 V with PC and 2.47 V with the mixture PC-THF. Polarization curves of such a system were obtained by galvanostatic sweeping at a rate of 4 mA/cm$^2$ per hour.

Figure 4:
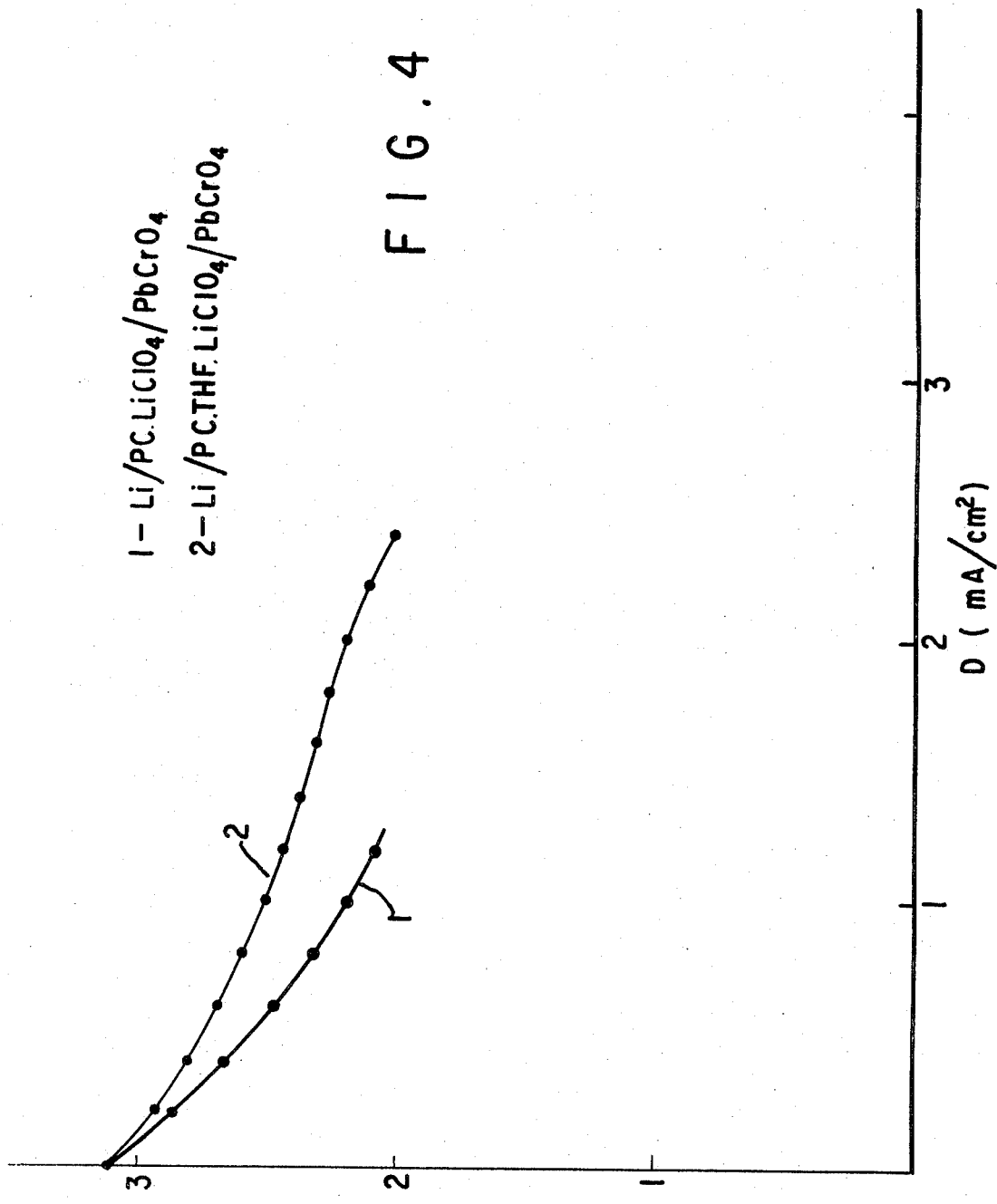
FIG. 4 is a graph which shows a polarization curve of a system using lead chromate as positive active material.

The results are shown in FIG. 4 where the voltage V in volts has been plotted as ordinates against the current density D in milliamperes per cm$^2$ as abscissae. Curve 1 relates to the system Li-molar solution of Li-ClO$_4$ in Pc-PbCrO$_4$ and curve 2 to the system Li-molar solution of LiClO$_4$ in PC + THF − PbCrO$_4$.

The lithium-argentous chromate system has been similarly tested with the various electrolytes hereabove described.

The open circuit voltage was in all cases about 3.2 volts.

Discharge tests of the cells with electrolytes 1-8 of Table 1 across a 62,000 ohm resistor at 30°C. have been carried out; the following table gives the average voltages obtained with such cells.

TABLE 3

| No. Electrolyte from table 1 | Average voltage (in volts) |
| --- | --- |
| 1 | 3.05 |
| 2 | 3.10 |
| 3 | 3.06 |
| 4 | 3.07 |
| 5 | 3.10 |
| 6 | 3.10 |
| 7 | 3.10 |
| 8 | 3.10 |

The polarization curves of the various systems have been plotted by galvanostatic sweeping at a rate of 4 mA per cm$^2$ per hour.

Figure 5:
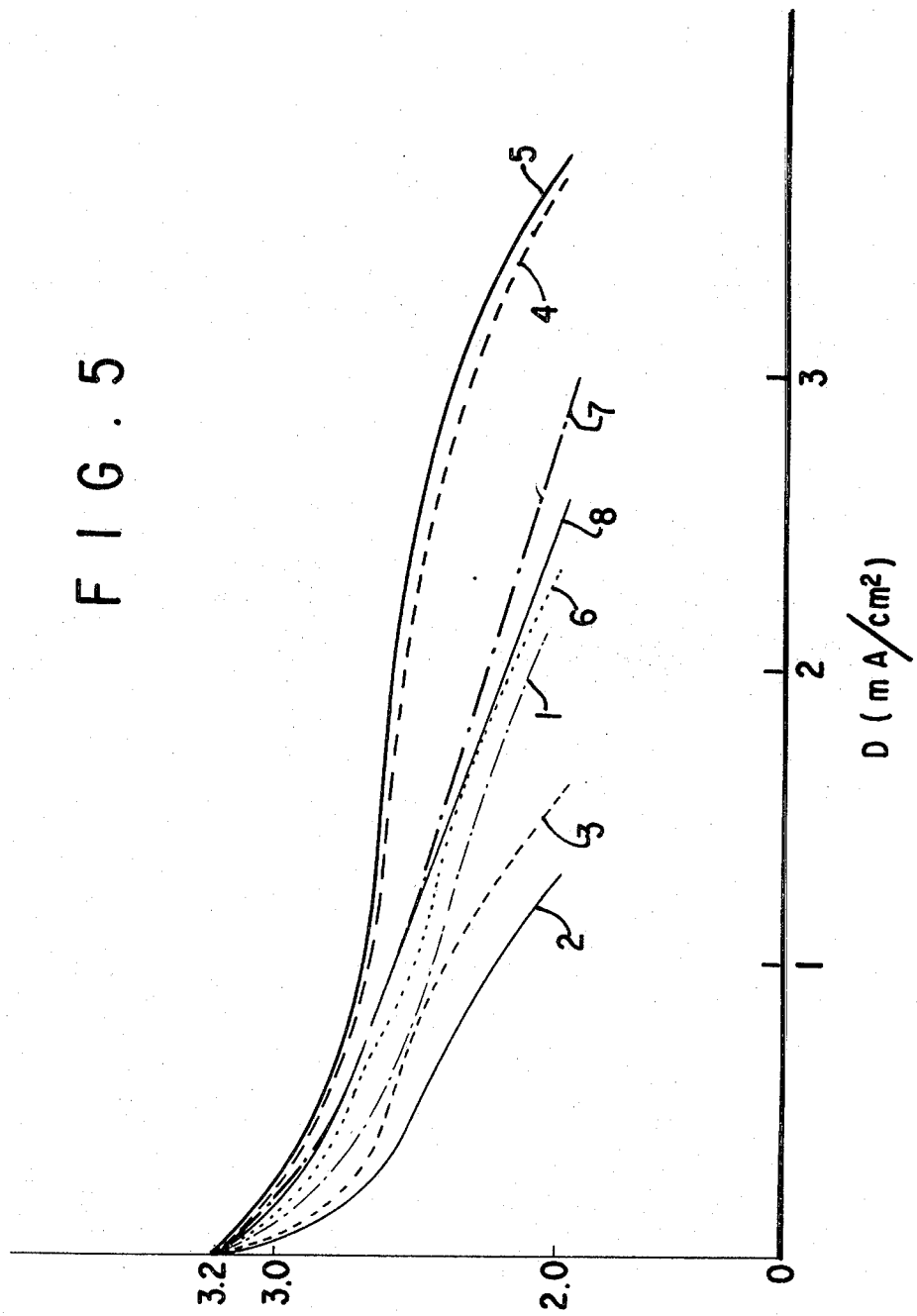
FIG. 5 is a graph which shows polarization curves of systems according to the invention using argentous chromate as postive active material and electrolyte with various solvents all according to the invention.

These curves are reproduced in FIG. 5. In FIG. 5, the voltage V in volts, has been plotted as ordinates and the current density D in milliamperes per cm$^2$ in abscissae. The reference numbers given to the curves correspond to the number of the electrolyte (table 1) used for each miniature cell. These curves show that the systems according to the invention, using argentous chromate as positive active material have a relatively high dischargeability and can bear without excessive polarization discharges at relatively high current densities, as compared to the usual rate used in watches (10 to 30 microamperes per cm$^2$).

It is to be understood that the invention is in no way limited to the embodiments which have been described and illustrated solely as examples. More especially, it is possible to bring some modifications, change some dispositions or replace some means by equivalent means within the scope of the appended claims without departing from the spirit of the invention.

What is claimed is

1. Miniature electric cell with a nonaqueous electrolyte, said cell being of the type comprising a lithium negative electrode and a positive electrode whose active material consists of about 1 percent by weight of carbon black as conductive material and about 99 percent by weight of argentous chromate.

2. Miniature electric cell according to claim 1, wherein said electrolyte consists of a solution of lithium perchlorate in a solvent, said solvent being selected from the group consisting of polypropylene carbonate, tetrahydrofuran, dimethyl carbonate, mixtures of tetrahydrofuran - dimethoxyethane, tetrahydrofuran - propylene carbonate, methylformate - propylene carbonate, tetrahydrofuran - dimethyl carbonate and tetrahydrofuran - dimethoxyethane - propylene carbonate.

3. Electric cell according to claim 2 wherein the said solvent consists by volume of 70 percent tetrahydrofuran and 30 percent dimethoxyethane.

4. Electric cell according to claim 2 wherein the said solvent consists by volume of about 50 percent of propylene carbonate and 50 percent of methylformate.

5. Electric cell according to claim 2 wherein the said solvent consists of volume of about 70 percent tetrahydrofuran and 30 percent propylene carbonate.

6. Electric cell according to claim 2 wherein the said solvent consists by volume of 20 percent tetrahydrofuran and 80 percent dimethyl carbonate.

7. Electric cell according to claim 2 wherein the said solvent consists by volume of about 56 percent tetrahydrofuran, 24 percent dimethoxyethane and 20 percent propylene carbonate.

8. Electric cell according to claim 2 wherein the lithium perchlorate solution ranges from molar to 1.5 molar.

9. Sealed miniature cell comprising a cathode consisting by weight of about 1% carbon black and about 99% of argentous chromate as active material, an anode of lithium, a non-aqueous electrolyte consisting of lithium perchlorate solution in a solvent selected from the group consisting of propylene carbonate, tetrahydrofuran, dimethyl carbonate, mixtures of tetrahydrofuran - dimethoxyethane, tetrahydrofuran - propylene carbonate, methylformate - propylene carbonate, tetrahydrofuran - dimethyl carbonate and tetrahydrofuran - dimethoxyethane - propylene carbonate, a separator comprised of layers of felted fibers unaltered by the electrolyte and the said active material, a casing comprising a metallic bottom cup into which said cathode is deposited and a metallic cover, said bottom cup and the cover constituting the respective terminals of the cell and being in direct electrical contact respectively with the cathode and the anode and an insulating gasket separating said cup and cover.

10. Miniature cell according to claim 9 wherein a non-corroding grid is embedded in the lithium disk constituting the anode, and welded to said cover constituting the negative terminal.

11. Minature cell according to claim 10 wherein said grid is of stainless steel.

* * * * *

UNITED STATES PATENT OFFICE
CERTIFICATE OF CORRECTION

Patent No. 3,853,627     Dated December 10, 1974

Inventor(s) Gerard Lehmann and Jean-Paul Gabano

It is certified that error appears in the above-identified patent and that said Letters Patent are hereby corrected as shown below:

In Item 30 of the title page of this patent, "Foreign Application Priority Data" should read:

---October 29, 1970 France 70 39 140

---January 14, 1971 France 71 01 175---.

Signed and Sealed this twenty-ninth Day of July 1975

[SEAL]

Attest:

RUTH C. MASON
*Attesting Officer*

C. MARSHALL DANN
*Commissioner of Patents and Trademarks*